(12) United States Patent
Yan

(10) Patent No.: US 12,130,028 B2
(45) Date of Patent: Oct. 29, 2024

(54) RADIATION HEAT EXCHANGING AIR CONDITIONING SYSTEM AND RADIATION HEAT EXCHANGING CEILING THEREOF

(76) Inventor: Jiguang Yan, Guangdong (CN)

( * ) Notice: Subject to any disclaimer, the term of this patent is extended or adjusted under 35 U.S.C. 154(b) by 0 days.

(21) Appl. No.: 13/003,449

(22) PCT Filed: Jul. 9, 2009

(86) PCT No.: PCT/CN2009/072701
§ 371 (c)(1),
(2), (4) Date: Feb. 23, 2011

(87) PCT Pub. No.: WO2010/003378
PCT Pub. Date: Jan. 14, 2010

(65) Prior Publication Data
US 2011/0146950 A1     Jun. 23, 2011

(30) Foreign Application Priority Data

Jul. 10, 2008 (CN) .......................... 200810029359.6

(51) Int. Cl.
*F24F 1/0063* (2019.01)
*E04B 9/04* (2006.01)
(Continued)

(52) U.S. Cl.
CPC .......... *F24F 1/0063* (2019.02); *E04B 9/0421* (2013.01); *E04B 9/0485* (2013.01);
(Continued)

(58) Field of Classification Search
CPC ........ E04B 9/0421; E04B 9/0485; F24D 3/12; F24D 3/14; F24D 3/18; F24D 3/165;
(Continued)

(56) References Cited

U.S. PATENT DOCUMENTS

| 1,771,269 A | * | 7/1930 | Musgrave | ................. F24D 3/14 165/56 |
| 3,653,221 A | * | 4/1972 | Angus | ....................... F25B 5/00 62/223 |

(Continued)

FOREIGN PATENT DOCUMENTS

| CN | 2513043 | 9/2002 |
| CN | 1467451 | 1/2004 |

(Continued)

OTHER PUBLICATIONS

International Search Report for international application No. PCT/CN2009/072701, dated Oct. 15. 2009 (6 pages).

*Primary Examiner* — Christopher R Zerphey
(74) *Attorney, Agent, or Firm* — Novoclaims Patent Services LLC; Mei Lin Wong

(57) ABSTRACT

A radiation heat exchanging air conditioning system and a radiation heat exchanging ceiling thereof are disclosed. The air conditioning system includes a heat pump system (7) and a water circulation system (8), and water circulation system (8) includes a heat exchanging device (11) for water, a pump (9), a heat exchanging device (10) for air, a radiation heat exchanging ceiling (20) and air outlets (15). The heat is exchanged between the heat exchanging device (11) for water and the heat pump system (7). The radiation heat exchanging ceiling (20) includes a metal ceiling panel (1) and a heat exchanging coil (2), said heat exchanging coil (2) is installed on the poor thermal-conductivity coil brackets (4) mounted on the upper surface of the metal ceiling panel (1), thus leading to the short distance and no direct contact between the heat exchanging coil (2) and the metal ceiling panel (1). A metal foil (5), a heat insulating material layer (3) and a seal layer (6) are provided above the heat exchanging coil (2).

6 Claims, 2 Drawing Sheets

(51) Int. Cl.
  *F24D 3/12* (2006.01)
  *F24D 3/18* (2006.01)
  *F24F 1/0047* (2019.01)
  *F24F 3/06* (2006.01)
  *F24F 5/00* (2006.01)

(52) U.S. Cl.
  CPC .............. *F24D 3/12* (2013.01); *F24D 3/18* (2013.01); *F24F 1/0047* (2019.02); *F24F 3/06* (2013.01); *F24F 5/0092* (2013.01); *Y02B 30/00* (2013.01); *Y02B 30/12* (2013.01)

(58) Field of Classification Search
  CPC ............ F24F 5/0092; F24F 5/0017; F24F 2001/0066; F24F 2001/0077; F24F 2001/0062; F24F 2005/0025; F24F 3/001; Y02B 30/12
  USPC ......... 62/92, 93, 98, 99, 237, 259.1; 165/49, 165/56
  See application file for complete search history.

(56) References Cited

U.S. PATENT DOCUMENTS

| | | | | |
|---|---|---|---|---|
| 4,024,728 | A * | 5/1977 | Gustafsson | F24F 3/001 62/238.6 |
| 4,205,719 | A * | 6/1980 | Norell | F24D 3/14 165/76 |
| 4,338,994 | A * | 7/1982 | Hewing et al. | |
| 5,372,011 | A * | 12/1994 | O'Neal | |
| 5,931,381 | A * | 8/1999 | Fiedrich | |
| 6,092,587 | A * | 7/2000 | Ingram | F24D 13/02 165/56 |
| 6,158,499 | A * | 12/2000 | Rhodes | F24F 5/0017 165/10 |
| 6,170,271 | B1 * | 1/2001 | Sullivan | |
| 6,311,764 | B1 * | 11/2001 | Schulz et al. | |
| 6,910,526 | B1 * | 6/2005 | Sokolean | F28F 1/22 165/56 |
| 2008/0164005 | A1 * | 7/2008 | Keller | |
| 2008/0264602 | A1 * | 10/2008 | Newberry | |
| 2009/0101305 | A1 * | 4/2009 | Clark | |

FOREIGN PATENT DOCUMENTS

| | | |
|---|---|---|
| CN | 2715030 | 8/2005 |
| CN | 200975802 | 11/2007 |
| CN | 201241411 | 5/2009 |

* cited by examiner

RADIATION HEAT EXCHANGING AIR CONDITIONING SYSTEM AND RADIATION HEAT EXCHANGING CEILING THEREOF

TECHNICAL FIELD

The present application relates to a direct-cooling air conditioning system. More specifically, the present application relates to a direct-cooling air conditioning system equipped with radiation heat-exchanging ceiling.

TECHNICAL BACKGROUND

The heat pump system in prior ceiling air conditioning system is not designed to make directly radiation heat-exchanging ceiling cool, but cold water from water-circulation system is used to make it cool. If the heat pump system is used to make it cool directly, the bottom surface of radiation heat-exchanging ceiling will dew heavily due to the lower temperature, and when the dew condenses to a certain extent it will drop from the ceiling and thus form so-called "artificial rain" in room. The prior ceiling conditioning system with water circulation system can be used in the relatively dry areas such as Northern Europe because the humidity of these areas is relatively low and radiation heat-exchanging ceiling will not dew even if at a relatively lower temperature.

However, there exists serious dewing problem when prior ceiling air conditioning system is used in relatively more humid areas such as Southern China or Southeast Asia. Heavy dewing occurred in the prior ceiling air conditioning systems installed in Macau, Shenzhen, etc., which resulted in frequent "artificial rain" from a room ceiling. For the prior air conditioning systems with dew point sensor they would automatically stop working frequently because the sensor detected heavy dewing.

After a long-term observation and study, the inventor of the present application found out that the main reasons why the prior radiation heat-exchanging ceiling are easy to dew in more humid environments are as follows:

1. The humidity in moist areas is about 70-80%, and the vapor content in the air is close to saturation. Its dew point temperature is only few lower than the ambient temperature. Therefore it is easy for vapor to contact objects of which their temperature is lower than the dew point and thus dew will form on these objects.

2. The prior radiation heat-exchanging ceiling includes metal ceiling plate and heat-exchanging coil. The heat-exchanging coil is installed into the grooves on top of the metal ceiling plate and contacts with the metal ceiling plate directly. Therefore the temperature on the area in which the heat-exchanging coil contacts with the metal ceiling is often lower than the dew point temperature.

In hot and moist areas the circulating water of a ceiling conditioning system would be set at a temperature as low as possible for effective cooling. Because its heat-exchanging coil contacts directly with its metal ceiling plate the circulating water at low temperature will readily make the temperature at the contacting area of the bottom surface of the metal ceiling plate lower than the dew point temperature. And this will inevitably cause dewing problems.

Therefore, it is necessary to provide a direct-cooling air conditioning system in which a radiation heat-exchanging ceiling is installed to avoid dewing.

SUMMARY OF THE INVENTION

The purpose of the present invention is to provide a direct-cooling air conditioning system or so-called ceiling conditioning system which employs a radiation heat-exchanging ceiling plate difficult to dew and which can overcome heavy dewing problems occurred on both prior radiation heat-exchanging ceiling and prior ceiling conditioning system.

As one aspect, the present invention is to provide a direct-cooling air conditioning system which includes a heat pump system and a water circulation system wherein the water circulation system includes a water circulation loop which further includes a circulating pump, an air heat-exchanging device and a water heat-exchanging device. The air heat-exchanging device exchanges heat with outside air and the water heat-exchanging device exchanges heat with the heat pump system. In the direct-cooling air conditioning system according to the present invention, the water circulation system includes a plurality of radiation heat-exchanging ceiling plates which comprise metal ceiling plates and heat-exchanging coils. The heat-exchanging coils are fixed on the top of the metal ceiling plates in such a way that the heat-exchanging coils are adjacent to but do not contact with the metal ceiling plates, and there is a layer of thermal insulation material on the top of the heat-exchanging coils. The heat-exchanging coils are connected to the circulation loop of the water circulation system.

In the above direct-cooling air conditioning system because the heat-exchanging coils do not directly contact with the metal ceiling plates there is not any area on the metal ceiling plates with its temperature being lower than the dew point temperature. And thus it is difficult to dew on such an air conditioning system.

In addition, in the above direct-cooling air conditioning system the radiation heat-exchanging ceiling plates in a same room can be connected with each other in series or in parallel or in a combination of both in series and in parallel.

Preferably, in the direct-cooling air conditioning system one or more layers of metal foil can be further placed on the bottom of the thermal insulation material. That is, the metal foil can be placed between the heat-exchanging coils and the layer of thermal insulation material. In such a design the metal foil increases the heat-exchanging area for the heat-exchanging coils and thus improves heat-exchanging efficiency.

As a specific embodiment of the present invention, in the above direct-cooling air conditioning system coil brackets for supporting the heat-exchanging coils can be installed on the top surface of the metal ceiling plates wherein the coil brackets can be made from poor thermal conducting material such as plastics. The heat-exchanging coils can be mounted on the coil brackets. In such a design a correct positioning between the heat-exchanging coils and the metal ceiling plates can be so maintained that they neither contact each other nor be in an excessive distance.

As another specific embodiment of the present invention, in the above direct-cooling air conditioning system a sealing layer can be further placed on the top of the layer of thermal insulation material. The sealing layer covers over the layer of thermal insulation material so as to isolate it from the outside air. In such a design the outside air is prevented from entering into the layer of thermal insulation material, and therefore the heat-exchanging coils will not dew. The thermal insulation material can be kept dry to reach a better insulation effect.

As still another specific embodiment of the present invention, in the above direct-cooling air conditioning system an aluminum foil can be used as the metal foil and glass wool or mineral wool can be used as the thermal insulation material. The aluminum foil, the glass wool and the sealing layer can be stacked up or laminated to form a layer of aluminum foil/glass wool insulation material. In such a design the aluminum foil/glass wool insulation materials can be available from the market and it can be easily and conveniently closed over the heat-exchanging coils when assembling.

As yet another specific embodiment of the present invention, the above direct-cooling air conditioning system further includes a fresh flue (i.e. a passage for fresh air) with which a fan is equipped. The inlet of the fresh flue is in communication with the outdoor air, and its outlet is in communication with the indoor air. A heat-exchanging coil for fresh air is mounted within the fresh flue, which is connected between the circulating pump of the water circulation system and the heat-exchanging coils of the radiation heat-exchanging ceiling plates. In such a design, the fresh flue can provide dry and cold fresh air when the system is refrigerating, which will not only reduce the duty load of the radiation heat-exchanging ceiling but also prevent the temperature of the circulating water from being lower than the dew point temperature through preheating by the fresh air before entering into the heat-exchanging coils of the radiation heat-exchanging ceiling plates. Therefore dewing will be avoided.

As another specific embodiment of the direct-cooling air conditioning system of the present invention the water circulation loop further includes a water tank for thermal buffering which is positioned between the circulation pump and the heat-exchanging coil for fresh air. In such a design circulating water has a small fluctuation on its temperature and the compressor need not to turn on and off frequently.

As another specific embodiment of the direct-cooling air conditioning system of the present invention, the fresh flue is equipped with a solenoid valve. A solenoid valve is also placed between the circulating pump of the water circulation loop and the heat-exchanging coils of the radiation heat-exchanging ceiling. Such a design has the advantages of being easily adjusted and suitable for central air conditioning.

As another aspect the present invention is to provide a radiation heat-exchanging ceiling plate used in an air-conditioning system, particularly in a direct-cooling air conditioning system such as a ceiling conditioning system. The radiation heat-exchanging ceiling plate includes a metal ceiling plate and a heat-exchanging coil. The heat-exchanging coil is fixed on the top of the metal ceiling plate in such a way that the heat-exchanging coil is adjacent to but does not contact with the metal ceiling plate, and there is a layer of thermal insulation material on the top of the heat-exchanging coil.

Preferably in the above radiation heat-exchanging ceiling plate a layers of metal foil can be further placed on the bottom of the thermal insulation material. That is, the metal foil can be placed between the heat-exchanging coil and the layer of thermal insulation material.

Preferably in the above radiation heat-exchanging ceiling plate coil brackets for supporting the heat-exchanging coil can be installed on the top surface of the metal ceiling plate wherein the coil brackets can be made from poor thermal conducting material such as plastics. In such a design a correct positioning between the heat-exchanging coil and the metal ceiling plate can be so maintained that they neither contact each other nor be in an excessive distance.

Preferably in the above radiation heat-exchanging ceiling plate a sealing layer can be further placed on the top of the layer of thermal insulation material. The sealing layer covers over the layer of thermal insulation material so as to isolate it from the outside air.

Preferably in the above radiation heat-exchanging ceiling plate an aluminum foil can be used as the metal foil and glass wool or mineral wool can be used as the thermal insulation material. The aluminum foil, the glass wool and the sealing layer can be stacked up or laminated to form a layer of aluminum foil/glass wool insulation material.

The direct-cooling air conditioning system of the present invention (i.e. the ceiling conditioning system with radiation heat-exchanging ceiling) is not easy to dew when operation. It belongs to a real quite air conditioning system without any noise because both its compressor and pumps can be placed outside and there is no fan inside. Due to large heat-exchanging area of the ceiling conditioning system the inlet temperature of the coolant can be 5° C. higher than that of an ordinary air conditioning system, and the indoor temperature can be 3° C. higher than that of an ordinary air conditioning system with same comfort level. Therefore compared with an prior air conditioning system the direct-cooling air conditioning system of the present invention has a higher energy efficiency and will save energy in about more than 30%. Thus the direct-cooling air conditioning system of the present invention has a good prospect in the market.

The direct-cooling air conditioning system of the present invention (i.e. the ceiling conditioning system with radiation heat-exchanging ceiling) and the radiation heat-exchanging ceiling plate thereof will be further understood through the following illustrative and non-limitative description of preferred embodiments with reference to the appended drawings.

BRIEF DESCRIPTIONS FOR THE DRAWINGS

Figure 1:
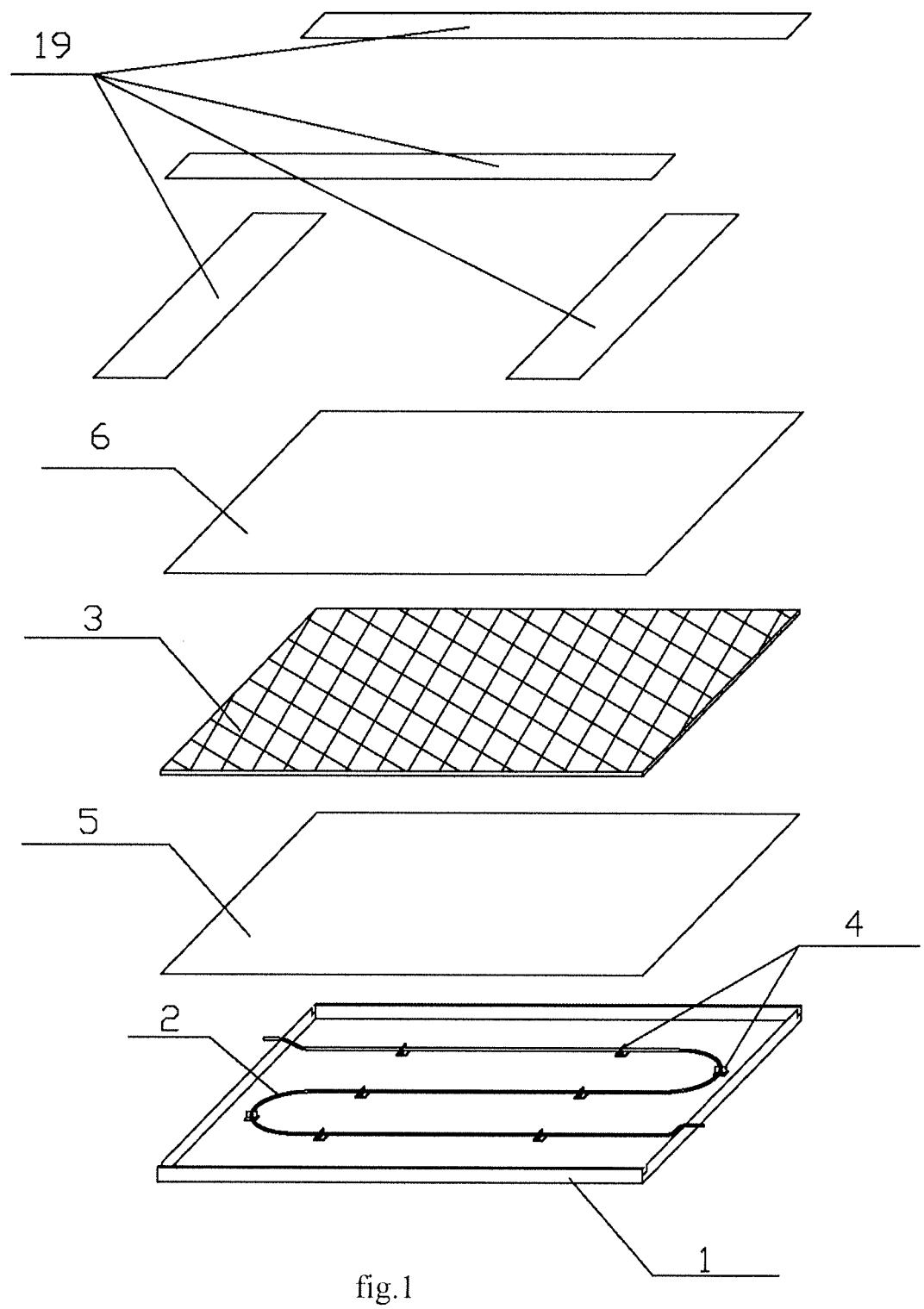
FIG. 1 is an explosive view of the radiation heat-exchanging ceiling according to one embodiment of the present invention.

The numerals in the drawing represent respectively: 1 metal ceiling plate, 2 heat-exchanging coil, 3 glass wool layer, 4 coil brackets, 5 aluminum foil, 6 sealing layer, 7 heat pump system, 8 water-circulation system, 9 pump, 10 air heat-exchanging device, 11 water heat-exchanging device, 12 fresh flue, 13 fan, 14 inlet, 15 outlet, 16 heat-exchanging coil for fresh air, 17 heat pump, 18 throttling elements (such as capillary or expansion valve), 19 sealing strips, and 20 a plurality of radiation heat-exchanging ceiling plates in each room.

DETAILED DESCRIPTION OF PREFERRED EMBODIMENTS

Figure 2:
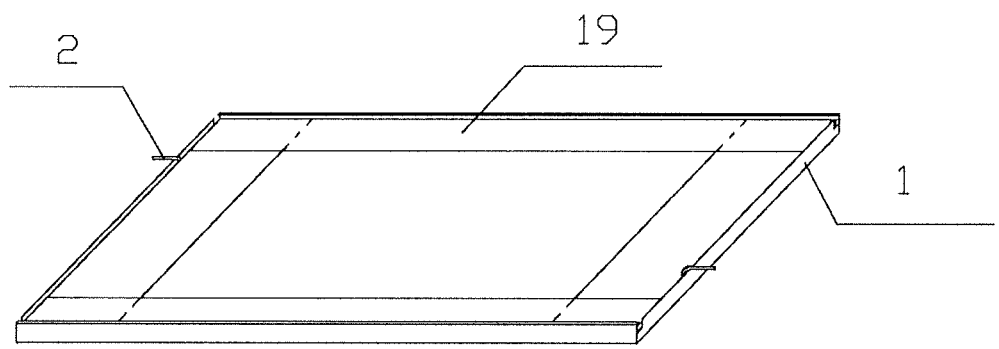
FIG. 2 is a diagrammatic sketch showing the structure of the radiation heat-exchanging ceiling according to one embodiment of the present invention.

One of embodiments of the radiation heat-exchanging ceiling plate of the present invention is shown in FIG. 1 and FIG. 2, including a metal ceiling plate 1 and a radiation heat-exchanging coil 2 in which the heat-exchanging coil 2 is placed on the top of the metal ceiling plate 1. The heat-exchanging coil 2 is adjacent to but do not contact with the metal ceiling plate 1. A layer of glass wool 3 covers on the top of the heat-exchanging coil 2. The upper surface of the metal ceiling plate 1 is equipped with coil brackets 4. The coil brackets 4 are made from poor thermal conducting material, and the heat-exchanging coil 2 is installed on the coil brackets 4.

A layer of aluminum foil 5 locates under the layer of glass wool 3. The aluminum foil 5 is positioned between the heat-exchanging coil 2 and the layer of glass wool 3. There is also a sealing layer 6 on the top of the layer of glass wool 3. The sealing layer 6 covers on the layer of glass wool 3 so as to insolate it from the outside air. The aluminum foil 5 can also be replaced by a copper foil, and the layer of glass wool 3 replaced by another insulation material.

Figure 3:
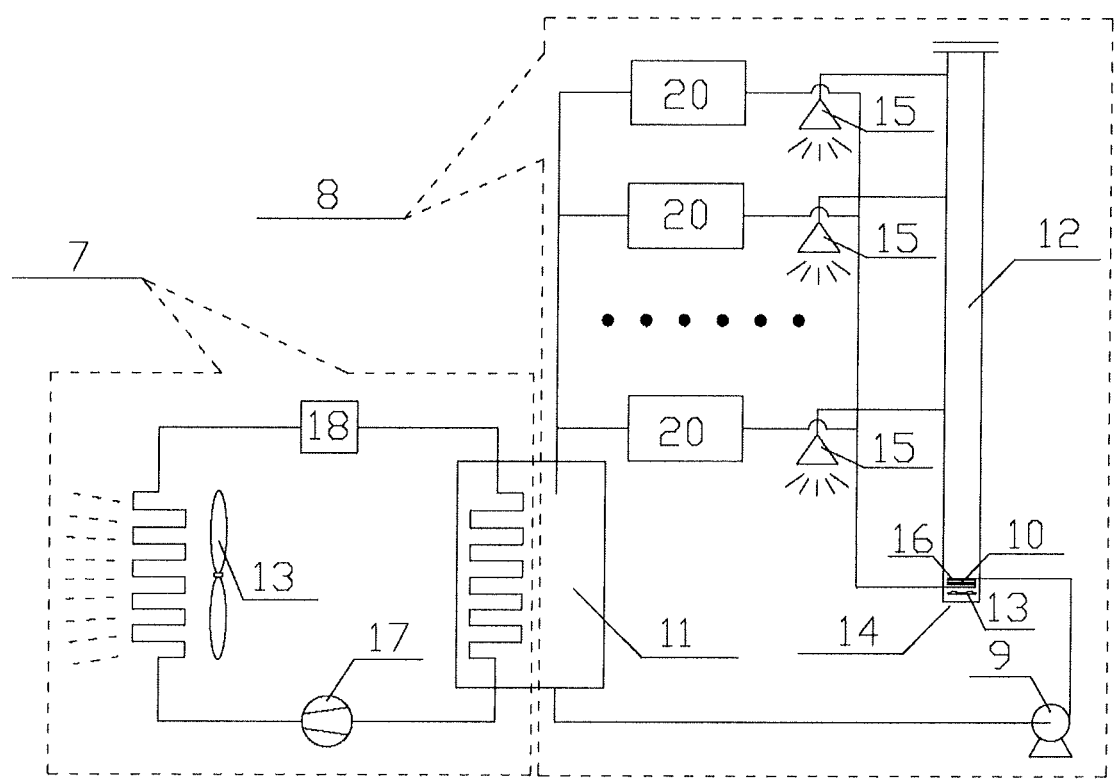
FIG. 3 is a schematic flowchart of the direct-cooling air conditioning system according to one embodiment of the present invention.

One of embodiments of the direct-cooling air conditioning system of the present invention is shown in FIG. 3, in which a radiation heat-exchanging ceiling is used. The direct-cooling air conditioning system includes a heat pump system 7 and a water circulation system 8 in which the water circulation system 8 further includes a water circulation loop comprising a circulation pump 9, an air heat-exchanging device 10, and a water heat-exchanging device 11. The air heat-exchanging device 10 exchanges heat with the outside air, and the water heat-exchanging device 11 exchanges heat with the heat pump system. The water circulation system 8 comprises a plurality of radiation heat-exchanging ceiling plates as shown in FIG. 1 with their heat-exchanging coils 2 being connected into the circulation loop of the water circulation system 8.

The above direct-cooling air conditioning system can further comprises a fresh flue 12 which is equipped with a fan 13. The inlet 14 of the fresh flue 12 is in communication with the outdoor air, and its outlet 15 is in communication with the indoor air. A heat-exchanging coil 16 for fresh air is placed within the fresh flue 12, and it is connected between the pump 9 and the heat-exchanging coils 2 of the radiation heat-exchanging ceiling plates. The water heat-exchanging device 11 can be a water tank for thermal buffering which is positioned between the pump 9 and the heat-exchanging coil 16 for fresh air. The evaporator coils of the heat pump system 7 are installed in the water tank for thermal buffering.

A solenoid valve can be equipped in the fresh flue 12, and a solenoid valve can also be placed between the pump 9 of the water circulation loop and the heat-exchanging coils 2 of the radiation heat-exchanging ceiling plates (not shown in the figures).

As another embodiment of the direct-cooling air conditioning system of the present invention the water circulation loop can have an additional water tank for thermal buffering.

The invention claimed is:

1. A radiation heat-exchanging ceiling plate used for an air conditioning system on a ceiling of a building structure, comprising:
a metal ceiling plate having a bottom side and a peripheral side extended from said bottom side and defining a plate receiving cavity formed by said bottom side and peripheral side;
a heat-exchanging coil received inside said plate receiving cavity of said metal ceiling plate, mounted on a top of said metal ceiling plate and not directly contacting said metal ceiling plate by a plurality of coil brackets with low thermal conductivity, wherein said coil brace are in direct contact with said metal ceiling plate and said heat-exchanging coil so that said heat-exchanging coil is maintained at a preset distance from said metal ceiling plate while said heat-exchanging coil is supported by said metal ceiling plate through the coil brackets, and a gap is formed between said heat-exchanging coil and said metal ceiling plate, avoiding direct contact between said heat-exchanging coil and said metal ceiling plate, thereby direct conduction between said coil brackets and said metal ceiling plate is minimized while heat exchange by radiation between said coil brackets and said metal ceiling plate is carried out effectively;
a layer of thermal insulation material on a top of said heat-exchanging coil for blocking air movement between said heat-exchanging coil and outside; and
a layer of metal foil placed between said heat-exchanging coil and said layer of thermal insulation material,
wherein said heat-exchanging coil is insulated by said coil brackets at a bottom side and said layer of thermal insulation material at said top of said heat-exchanging coil, thereby hot and cold spots in said metal ceiling plate are effectively eliminated.

2. The radiation heat-exchanging ceiling plate according to claim 1, comprising: a sealing layer being installed on a top of said layer of thermal insulation material and covered over said layer of thermal insulation material so as to isolate said layer of thermal insulation material from outside air, and sealing strips arranged on top of said sealing layer, said coil brackets are made from plastics, wherein said metal ceiling plate, said coil brackets, said heat-exchanging coil, said layer of metal foil, said layer of thermal insulation material, said sealing layer and said sealing strip form a one-piece modular structure with two ends of said heat-exchanging coil extending outside said one-piece modular structure, said radiation heat-exchanging ceiling plate in said one-piece modular structure is arranged to install on top of a false ceiling of a building structure.

3. The radiation heat-exchanging ceiling plate according to claim 2, wherein said metal foil is aluminum foil; said thermal insulation material is glass wool; and said aluminum foil, said glass wool, and said sealing layer are stacked up to form a layer of aluminum foil/glass wool insulation material.

4. A direct-cooling air conditioning system, comprising:
a heat pump system comprising evaporator coils; a water circulation system comprising a plurality of radiation heat-exchanging ceiling plates; and a water circulation loop;
wherein each said radiation heat-exchanging ceiling plate comprises: a metal ceiling plate; a heat-exchanging coil being mounted on a top of said metal ceiling plate by coil brackets with low thermal conductivity, said coil brackets are in direct contact with said metal ceiling plate and said heat-exchanging coil, said heat-exchanging coil being adjacent to said metal ceiling plate, not contacting said metal ceiling plate directly and supported by said metal ceiling plate through said coil brackets so that a gap is formed between said heat-exchanging coil and said metal ceiling plate and direct contact between said heat-exchanging coil and said metal ceiling plate is avoided, thereby direct conduction between said coil brackets and said metal ceiling plate is minimized while heat exchange by radiation between said coil brackets and said metal ceiling plate is carried out effectively; a layer of thermal insulation material on a top of said heat-exchanging coil, and a layer of metal foil being placed between said heat-exchanging coil and said layer of thermal insulation material, wherein said heat-exchanging coil is insulated by said coil brackets at a bottom side and said layer of thermal insulation material at said top of said heat-exchanging coil, thereby hot and cold spots in said metal ceiling plate are eliminated, said water circulation loop having a circulating pump, a heat-exchanging coil for fresh air, and a water tank, said heat-exchanging coil for fresh air exchanging heat with outside air, said water tank for thermal buffering exchanging heat with said heat pump system, and said evaporator coils are installed in said water tank for thermal buffering, and said heat-exchanging coils being connected to said water circulation loop of said water circulation system.

5. The direct-cooling air conditioning system according to claim 4, comprising: a fresh flue, said fresh flue being equipped with a fan, an inlet of said fresh flue being in communication with the outdoor air, an outlet of said fresh flue being in communication with indoor air, said heat-exchanging coil for fresh air being mounted within said fresh flue, and said heat-exchanging coil for fresh air being connected between said circulating pump of said water circulation system and said heat-exchanging coils of said radiation heat-exchanging ceiling plates.

6. The direct-cooling air conditioning system according to claim 5, wherein said water tank is positioned between said circulation pump and said heat-exchanging coil for fresh air.

* * * * *